United States Patent
Thantharate et al.

(10) Patent No.: US 11,882,626 B1
(45) Date of Patent: Jan. 23, 2024

(54) SELECTING ANTENNA CONFIGURATIONS BASED ON TRANSMISSION TYPE

(71) Applicant: Sprint Spectrum LP, Overland Park, KS (US)

(72) Inventors: Anurag Thantharate, Overland Park, KS (US); Sreekar Marupaduga, Overland Park, KS (US); Sougata Saha, Olathe, KS (US); Hannah Sifuentes, Lee's Summit, MO (US)

(73) Assignee: Sprint Spectrum LP, Overland Park, KS (US)

( * ) Notice: Subject to any disclaimer, the term of this patent is extended or adjusted under 35 U.S.C. 154(b) by 85 days.

(21) Appl. No.: 16/897,623

(22) Filed: Jun. 10, 2020

(51) Int. Cl.
- H04W 8/24 (2009.01)
- H01Q 1/24 (2006.01)
- H04W 28/24 (2009.01)

(52) U.S. Cl.
CPC ............ H04W 8/245 (2013.01); H01Q 1/243 (2013.01); H04W 28/24 (2013.01)

(58) Field of Classification Search
CPC ..... H04W 8/245; H04W 28/24; H04W 72/23; H04W 28/0268; H01Q 1/243
See application file for complete search history.

(56) References Cited

U.S. PATENT DOCUMENTS

| | | | | |
|---|---|---|---|---|
| 6,671,495 | B1* | 12/2003 | Lappetelainen | H04B 7/0808 370/245 |
| 2006/0079221 | A1* | 4/2006 | Grant | H04B 1/71072 455/423 |
| 2008/0119181 | A1* | 5/2008 | Suzuki | H04W 72/1268 455/422.1 |
| 2010/0189030 | A1* | 7/2010 | Li | H04B 7/0628 370/328 |
| 2012/0046003 | A1* | 2/2012 | Ying | H04B 7/0689 455/90.2 |
| 2013/0322568 | A1* | 12/2013 | Pais | G06F 1/1698 375/316 |
| 2014/0206414 | A1* | 7/2014 | Oh | H04W 16/28 455/562.1 |
| 2017/0359829 | A1 | 12/2017 | Tabet et al. | |
| 2017/0374541 | A1* | 12/2017 | Tate | H01Q 1/243 |
| 2018/0351610 | A1* | 12/2018 | Zhang | H04B 7/0456 |
| 2020/0169995 | A1* | 5/2020 | Nam | H04W 72/085 |
| 2020/0178092 | A1* | 6/2020 | Ren | H04W 24/02 |
| 2020/0374862 | A1* | 11/2020 | Wang | H04W 76/14 |
| 2021/0105655 | A1* | 4/2021 | Cheng | H04W 64/00 |

* cited by examiner

Primary Examiner — Margaret G Mastrodonato
(74) Attorney, Agent, or Firm — Jones Robb, PLLC

(57) ABSTRACT

Selecting combinations of antennae of a wireless device based on transmission type includes determining a transmission type of a transmission between the wireless device and an access node and, based on the transmission type, instructing the wireless device to utilize different antenna configurations, including 5G EN-DC, MIMO, mm-wave, and other combinations. The different antenna configurations comprise different combinations of antennae of the wireless device.

18 Claims, 6 Drawing Sheets

```
┌─────────────────────────────────────────┐
│                                         │
│  CORRELATE TYPES OF TRANSMISSIONS       │
│    WITH COMBINATIONS OF ANTENNAE        │
│                  710                    │
│                                         │
│                   │                     │
│                   ▼                     │
│                                         │
│   INSTRUCT WIRELESS DEVICE TO USE       │
│      DIFFERENT COMBINATIONS FOR         │
│        DIFFERENT TRANSMISSIONS          │
│                  720                    │
│                                         │
└─────────────────────────────────────────┘
```

SELECTING ANTENNA CONFIGURATIONS BASED ON TRANSMISSION TYPE

SELECTING ANTENNA CONFIGURATIONS BASED ON TRANSMISSION TYPE

TECHNICAL BACKGROUND

As wireless networks evolve and grow, there are ongoing challenges in communicating data across different types of networks. For example, a wireless network may include one or more access nodes, such as base stations, for providing wireless voice and data service to wireless devices in various coverage areas of the one or more access nodes. As wireless technology continues to improve, various different iterations of radio access technologies (RATs) may be deployed within a single wireless network. Such heterogeneous wireless networks can include newer 5G and millimeter wave (mm-wave) networks, as well as older legacy networks (such as 3G). In some cases, deployment of 5G new radio (NR) access nodes alongside or co-located with 4G long-term evolution (LTE) access nodes utilizes dual connectivity technology (e.g. EN-DC), wherein control information is transmitted using the 4G RAT and data is transmitted using the 5G RAT.

Further, with the evolution of 5G, mm-wave, and sub-6G, increasing numbers of antennae can be used to form beams or perform multiple-in multiple-out (MIMO) operating modes, including single-user (SU-MIMO) and/or a multi-user (MU-MIMO) mode. In a recent evolution of MIMO technology, known as massive MIMO or large-scale MIMO, an access node may utilize hundreds of antennae to simultaneously transmit each of a plurality of different data streams to a corresponding plurality of wireless devices. Massive MIMO has been identified as one of the promising air interface technologies to address the massive capacity requirement required demanded by 5G networks.

However, activating various transmission modes within a wireless network can result in increased interference throughout the network, as well as increased power consumption. In particular, newer wireless devices that are being developed with additional transceivers and antennae that are capable of multi-RAT communication and various MIMO modes may suffer from degraded battery life and/or signal quality due to increased interference.

OVERVIEW

Exemplary embodiments described herein include methods, systems, and processing nodes for. An exemplary method for selecting an antenna configuration for a wireless device based on a transmission type includes determining a transmission type associated with the wireless device, the transmission type being associated with a transmission between the wireless device and an access node, and based on the transmission type, instructing the wireless device to utilize different antenna configurations, wherein the different antenna configurations comprise different combinations of antennae of the wireless device.

Another exemplary method for selecting an antenna configuration for a wireless device based on a transmission type includes determining that a type of a transmission between a wireless device and an access node does not require using all the antennae of the wireless device, and instructing the wireless device to utilize a reduced quantity of antennae for the transmission.

An exemplary system for selecting an antenna configuration for a wireless device based on a transmission type includes a processing node and a processor coupled to the processing node. The processor is configured to perform operations including determining a transmission type associated with the wireless device, the transmission type being associated with a transmission between the wireless device and an access node, and based on the transmission type, instructing the wireless device to utilize different antenna configurations, wherein the different antenna configurations comprise different combinations of antennae of the wireless device.

DETAILED DESCRIPTION

Figure 1:
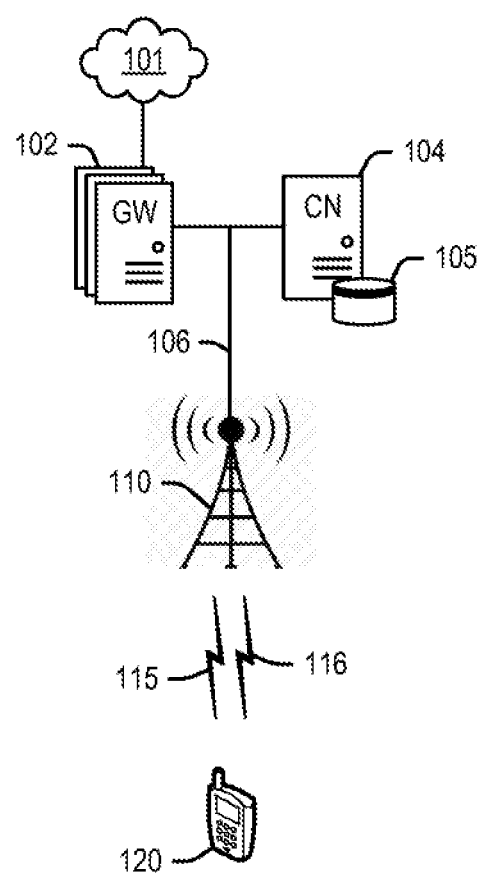
FIG. 1 depicts an exemplary system for selecting an antenna configuration for a wireless device based on a transmission type.

In embodiments disclosed herein, multi-antenna connectivity is enabled by using different antennae of a wireless device based on a type of service or transmission. The type of service is based on quality of service (QoS) parameters, and can be obtained from a service request, as further described below. Dynamic switching is performed between different antenna configurations and arrangements for different transmissions (such as 4G, 5G, mm-wave, types of MIMO, etc.), thereby enabling network operators as they advance deployment of various heterogenous networks that include 5G EN-DC, standalone 5G, sub-6, mm-wave, and other past and future radio access technologies. (RATs). Further benefits include less interference (based on fewer antennae unnecessarily being used), better utilization of the radiofrequency spectrum, power savings on the wireless device, and an improved user experience.

In an exemplary embodiment further described herein, a method for selecting an antenna configuration includes determining a transmission type of a transmission between a wireless device and an access node and, based on the transmission type, instructing the wireless device to utilize different antenna configurations, which comprise different combinations of antennae of the wireless device. The transmission type can be correlated with different combinations of antennae of the wireless device. Based on the instruction, the wireless device activates or deactivates its antennae in different combinations and arrangements. For example, the various antennae can include 4G antennae, 5G antennae (including sub-6G and mm-wave), 3G or older antennae, and the antennae can be activated in different combinations (such as 4×4 MIMO combination, a 4×2 MIMO combination, a 2×2 MIMO combination), and so on. One or more primary antennae and secondary antennae may be defined, and the wireless device instructed to use different primary and/or secondary antennae for transmissions associated with different priorities. Such correlation of types of transmissions with different combinations of antennae of the wireless device can be enabled by referring to a table associating different QoS identifiers with different combinations of antennae.

Further the wireless device can be instructed to simultaneously utilize different combinations of antennae for simultaneous transmissions of the same or different type. For example, two differently-tuned antennae can be activated for different transmissions that use different frequencies. In another example, two simultaneous 4×2 MIMO transmissions can be received at a wireless device activating two 4×2 MIMO antenna configurations, as opposed to one 4×4 MIMO antenna configuration, or any other antenna configuration. In another example, two different simultaneous transmissions (e.g. a VoIP service and a data streaming service) can be performed using two different antenna configurations that are configured for each specific service (e.g. a high priority or low-latency antenna configuration for the VoIP service and a mm-wave antenna for the data streaming service). Further, the wireless device can be instructed to limit a quantity of antennae being utilized for transmission types that are not correlated with higher quantities of antennae. For example, if a type of transmission does not require a 4×4 MIMO combination of antennae, then an antenna configuration can be selected that uses fewer antennae, e.g. a 4×2 antenna combination or a 2×2 antenna combination.

Instructing the wireless device to utilize the different antenna configurations can include transmitting an indication to the wireless device from the access node. The indication may be an information element sent via radio resource control (RRC) message, in a system information block (SIB) message, or any equivalent means for indicating to the wireless device to activate or utilize the antenna combination(s) correlated with the transmission type or service. The instruction can be sent responsive to receiving the service request, or periodically throughout a communication session. In some examples, the wireless device can initiate communication using a different combination of antennae than what is eventually determined based on the type of data being transmitted. A default number (or all) antennae may be initially activated or used on a wireless device, and then different combinations are deactivated or selected based on transmission type.

Further, the type of the transmission or service can be determined by obtaining one or more quality of service (QoS) identifiers associated with the transmission or service. For example, the QoS identifier comprises one or more of a QoS Class Identifier (QCI), a 5G QCI (5QI), a priority level, an error rate, a guaranteed bit rate (GBR) identifier, or delay budget. The QoS identifier can be identified or obtained from a service request. For example, the service request for a service can be received at the access node from the wireless device or from a network entity attempting to communicate with the wireless device. Upon receiving the service request, a processing node communicably coupled to the access node can perform the correlation with the antenna configurations and trigger dispatch of the aforementioned instructions to the wireless device.

As described herein, processing nodes configured to select combinations of antennae can be further configured to perform the aforementioned operations such as determining that a type of a transmission between a wireless device and an access node does not require using all the antennae of the wireless device, and instructing the wireless device to utilize a reduced quantity of antennae for the transmission. Such processing nodes and/or methods can be incorporated into a system comprising one or more network node and processors. These and additional operations are further described with respect to the embodiments depicted in FIGS. 1-9 below.

FIG. 1 depicts an exemplary system 100 for selecting antenna configurations based on transmission type. System 100 includes a communication network 101, gateway node (s) 102, controller node 104, access node 110, and wireless device 120. Access node 110 can be any network node configured to provide communication between wireless device 120 and communication network 101, including standard access nodes and/or short range, low power, small access nodes. For instance, access node 110 may include any standard access node, such as a macrocell access node, base transceiver station, a radio base station, an eNodeB device, an enhanced eNodeB device, a next generation or gigabit NodeB device (gNBs) in 5G networks, or the like. In other embodiments, access node 110 can be a small access node including a microcell access node, a picocell access node, a femtocell access node, or the like such as a home NodeB or a home eNodeB device. By virtue of comprising a plurality of antennae as further described herein, access node 110 can deploy or implement different radio access technologies (RATs) such as 3G, 4G, 5G, sub-6G, mm-wave, as well as transmission modes including multiple-input-multiple-output (MIMO), single user MIMO (SU-MIMO), multi-user MIMO (MU-MIMO), etc. Moreover, wireless device 120 can also be equipped with a plurality of antennae enabling these different types of transmissions. For example, wireless device 120 can simultaneously communicate with access node 110 using a first combination of antennae for transmission 115 and a second combination of antennae for transmission 116. Further, it is noted that while access node 110 wireless device 120 are illustrated in FIG. 1, any number of access nodes and wireless devices can be implemented.

In operation, access node 110 (or any other entity within system 100) may be configured to execute a method comprising determining a transmission type of transmissions 115, 116 between wireless device 120 and access node 110 and, based on the transmission type, instructing the wireless device 120 to utilize different antenna configurations, which comprise different combinations of antennae of the wireless device 120. The transmission type of each of transmissions 115, 116 can be correlated with different combinations of antennae of the wireless device 120. Based on the instruction, the wireless device 120 activates or deactivates its antennae in different combinations and arrangements. For example, the various antennae can include 4G antennae, 5G antennae (including sub-6G and mm-wave), 3G or older antennae, and the antennae can be activated in different combinations (such as 4×4 MIMO combination, a 4×2 MIMO combination, a 2×2 MIMO combination), and so on. One or more primary antennae and secondary antennae may be defined, and the wireless device 120 instructed to use different primary and/or secondary antennae if transmissions 115, 116 are associated with different priorities. Such correlation of types of transmissions with different combinations of antennae of the wireless device can be enabled by referring to a table associating different QoS identifiers with different combinations of antennae.

Further the wireless device 120 can be instructed to simultaneously utilize different combinations of antennae for simultaneous transmissions of the same or different type. For example, if transmission 115 is a 4G transmission and transmission 116 is a 5G transmission, then two differently-tuned antennae of wireless device 120 can be activated to simultaneously communicate using 4G and 5G. While in some cases such communication is known in the art and often referred to as dual connectivity (e.g. EN-DC), the selective activation of 4G and 5G antennae based on transmission type can enable completely separate 4G and 5G transmissions 115, 116, rather than be constrained by the control transmissions using a primary RAT (e.g. 4G in EN-DC). In another example, transmissions 115, 116 can include two simultaneous 4×2 MIMO transmissions. Thus, the wireless device 120 can be instructed to activate two 4×2 MIMO antenna configurations, as opposed to one 4×4 MIMO antenna configuration, or any other antenna configuration. In another example, the two different transmissions 115, 116 can be simultaneous (e.g. a VoIP call and an ongoing data streaming session), and wireless device 120 can be instructed to activate two different antenna configurations that are configured for each specific service (e.g. a high priority or low-latency antenna configuration for the VoIP service and a mm-wave antenna for the data streaming service). Further, the wireless device 120 can be instructed to limit a quantity of antennae being utilized for transmission types that are not correlated with higher quantities of antennae. For example, if a type of transmission does not require a 4×4 MIMO combination of antennae, then an antennae configuration can be selected that uses fewer antennae, e.g. a 4×2 antenna combination or a 2×2 antenna combination.

Instructing the wireless device 120 to utilize the different antenna configurations can include transmitting an indication from the access node 110 to the wireless device 120. The indication may be an information element sent via radio resource control (RRC) message, in a system information block (SIB) message, or any equivalent means for indicating to the wireless device 120 to activate or utilize the antenna combination(s) correlated with the transmission type of transmissions 115, 116. The instruction can be sent responsive to receiving the service request, or periodically throughout a communication session. In some examples, the wireless device 120 can initiate communication (e.g. from an idle state) using a different combination of antennae than what is eventually determined based on the type of data being transmitted. A default number (or all) antennae may be initially activated or used on wireless device 120, and then different combinations are deactivated or selected based on transmission type.

Further, the type of the transmissions 115, 116 can be determined by obtaining one or more quality of service (QoS) identifiers associated with the transmissions 115, 116. For example, the QoS identifier comprises one or more of a QoS Class Identifier (QCI), a 5G QCI (5QI), a priority level, an error rate, a guaranteed bit rate (GBR) identifier, or delay budget. The QoS identifier can be identified or obtained from a service request. For example, the service request for a service can be received at the access node 110 from the wireless device 120 or from a network entity attempting to communicate with the wireless device 120 via network 101. Upon receiving the service request, a processing node communicably coupled to the access node 110 can perform the correlation with the antenna configurations and trigger dispatch of the aforementioned instructions to the wireless device 120.

Access node 110 can comprise a processor and associated circuitry to execute or direct the execution of computer-readable instructions to perform operations such as those further described herein. Briefly, access node 110 can retrieve and execute software from storage, which can include a disk drive, a flash drive, memory circuitry, or some other memory device, and which can be local or remotely accessible. The software comprises computer programs, firmware, or some other form of machine-readable instructions, and may include an operating system, utilities, drivers, network interfaces, applications, or some other type of software, including combinations thereof. Further, access node 110 can receive instructions and other input at a user interface. Access node 110 communicates with gateway node 102 and controller node 104 via communication links 106, 107. Access node 110 may communicate with other access nodes (not shown) using a direct link such as an X2 link or similar.

Wireless device 120 may be any device, system, combination of devices, or other such communication platform capable of communicating wirelessly with access node 110 using one or more frequency bands deployed therefrom. Wireless device 120 may be, for example, a mobile phone, a wireless phone, a wireless modem, a personal digital assistant (PDA), a voice over internet protocol (VoIP) phone, a voice over packet (VOP) phone, or a soft phone, as well as other types of devices or systems that can exchange audio or data via access node 110. Other types of communication platforms are possible.

Communication network 101 can be a wired and/or wireless communication network, and can comprise processing nodes, routers, gateways, and physical and/or wireless data links for carrying data among various network elements, including combinations thereof, and can include a local area network a wide area network, and an internetwork (including the Internet). Communication network 101 can be capable of carrying data, for example, to support voice, push-to-talk, broadcast video, and data communications by wireless device 120, etc. Wireless network protocols can comprise MBMS, code division multiple access (CDMA) 1×RTT, Global System for Mobile communications (GSM), Universal Mobile Telecommunications System (UMTS), High-Speed Packet Access (HSPA), Evolution Data Optimized (EV-DO), EV-DO rev. A, Third Generation Partnership Project Long Term Evolution (3GPP LTE), and Worldwide Interoperability for Microwave Access (WiMAX), Fourth Generation broadband cellular (4G, LTE Advanced, etc.), and Fifth Generation mobile networks or wireless systems (5G, 5G New Radio ("5G NR"), or 5G LTE). Wired network protocols that may be utilized by communication network 101 comprise Ethernet, Fast Ethernet, Gigabit Ethernet, Local Talk (such as Carrier Sense Multiple Access with Collision Avoidance), Token Ring, Fiber Distributed Data Interface (FDDI), and Asynchronous Transfer Mode (ATM). Communication network 101 can also comprise additional base stations, controller nodes, telephony switches, internet routers, network gateways, computer systems, communication links, or some other type of communication equipment, and combinations thereof.

Communication links 106, 107 can use various communication media, such as air, space, metal, optical fiber, or some other signal propagation path—including combinations thereof. Communication links 106, 107 can be wired or wireless and use various communication protocols such as Internet, Internet protocol (IP), local-area network (LAN), optical networking, hybrid fiber coax (HFC), telephony, T1, or some other communication format—including combinations, improvements, or variations thereof. Wireless communication links can be a radio frequency, microwave, infrared, or other similar signal, and can use a suitable communication protocol, for example, Global System for Mobile telecommunications (GSM), Code Division Multiple Access (CDMA), Worldwide Interoperability for Microwave Access (WiMAX), Long Term Evolution (LTE), 5G NR, or combinations thereof. Communications links 106, 107 may include Si communications links. Other wireless protocols can also be used. Communication links 106, 107 can be a direct link or might include various equipment, intermediate components, systems, and networks. Communication links 106, 107 may comprise many different signals sharing the same link Gateway node 102 can be any network node configured to interface with other network nodes using various protocols. Gateway node 102 can communicate user data over system 100. Gateway node 102 can be a standalone computing device, computing system, or network component, and can be accessible, for example, by a wired or wireless connection, or through an indirect connection such as through a computer network or communication network. For example, gateway node 102 can include a serving gateway (SGW) and/or a public data network gateway (PGW), etc. One of ordinary skill in the art would recognize that gateway node 102 is not limited to any specific technology architecture, such as Long Term Evolution (LTE) or 5G NR, and can be used with any network architecture and/or protocol.

Gateway node 102 can comprise a processor and associated circuitry to execute or direct the execution of computer-readable instructions to obtain information. Gateway node 102 can retrieve and execute software from storage, which can include a disk drive, a flash drive, memory circuitry, or some other memory device, and which can be local or remotely accessible. The software comprises computer programs, firmware, or some other form of machine-readable instructions, and may include an operating system, utilities, drivers, network interfaces, applications, or some other type of software, including combinations thereof. Gateway node 102 can receive instructions and other input at a user interface.

Controller node 104 can be any network node configured to communicate information and/or control information over system 100. Controller node 104 can be configured to transmit control information associated with a handover procedure. Controller node 104 can be a standalone computing device, computing system, or network component, and can be accessible, for example, by a wired or wireless connection, or through an indirect connection such as through a computer network or communication network. For example, controller node 104 can include a mobility management entity (MME), a Home Subscriber Server (HSS), a Policy Control and Charging Rules Function (PCRF), an authentication, authorization, and accounting (AAA) node, a rights management server (RMS), a subscriber provisioning server (SPS), a policy server, etc. One of ordinary skill in the art would recognize that controller node 104 is not limited to any specific technology architecture, such as Long Term Evolution (LTE) or 5G NR, and can be used with any network architecture and/or protocol.

Controller node 104 can comprise a processor and associated circuitry to execute or direct the execution of computer-readable instructions to obtain information. Controller node 104 can retrieve and execute software from storage, which can include a disk drive, a flash drive, memory circuitry, or some other memory device, and which can be local or remotely accessible. In an exemplary embodiment, controller node 104 includes a database 105 for storing correlations of transmission types with antenna configurations, and so on. This information may be requested by or shared with access node 110 via links 106, 107, X2 connections, and so on. The software comprises computer programs, firmware, or some other form of machine-readable instructions, and may include an operating system, utilities, drivers, network interfaces, applications, or some other type of software, and combinations thereof. Controller node 104 can receive instructions and other input at a user interface.

Other network elements may be present in system 100 to facilitate communication but are omitted for clarity, such as base stations, base station controllers, mobile switching centers, dispatch application processors, and location registers such as a home location register or visitor location register. Furthermore, other network elements that are omitted for clarity may be present to facilitate communication, such as additional processing nodes, routers, gateways, and physical and/or wireless data links for carrying data among the various network elements, e.g. between access node 110 and communication network 101.

Further, the methods, systems, devices, networks, access nodes, and equipment described above may be implemented with, contain, or be executed by one or more computer systems and/or processing nodes. The methods described above may also be stored on a non-transitory computer readable medium. Many of the elements of communication system 100 may be, comprise, or include computers systems and/or processing nodes. This includes, but is not limited to: access node 110, controller node 104, and/or network 101.

Figure 2:
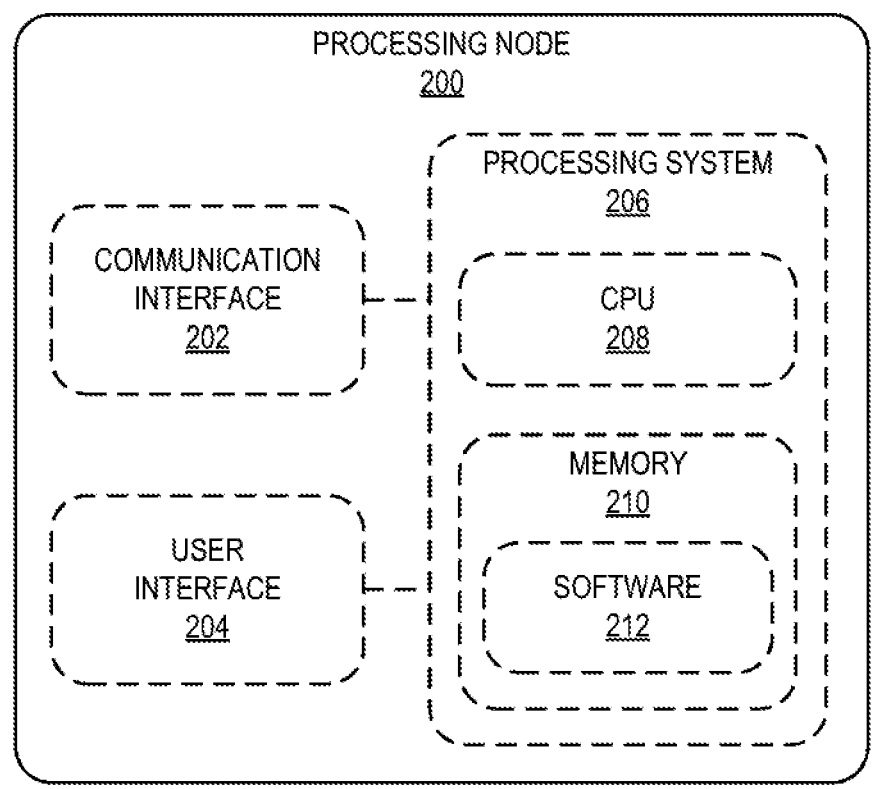
FIG. 2 depicts an exemplary processing node for selecting an antenna configuration for a wireless device based on a transmission type.

FIG. 2 depicts an exemplary processing node 200 for selecting an antenna configuration for a wireless device based on a transmission type. The processing node 200 includes a communication interface 202, user interface 204, and processing system 206 in communication with communication interface 202 and user interface 204. Processing system 206 includes storage 208, which can comprise a disk drive, flash drive, memory circuitry, or other memory device. Storage 208 can store software 210 which is used in the operation of the processing node 200. Storage 208 may include a disk drive, flash drive, data storage circuitry, or some other memory apparatus. For example, storage 208 may include a buffer. Software 210 may include computer programs, firmware, or some other form of machine-readable instructions, including an operating system, utilities, drivers, network interfaces, applications, or some other type of software. For example, software 210 may include a coherence determination module. Processing system 206 may include a microprocessor and other circuitry to retrieve and execute software 210 from storage 208. Processing node 200 may further include other components such as a power management unit, a control interface unit, etc., which are omitted for clarity. Communication interface 202 permits processing node 200 to communicate with other network elements. User interface 204 permits the configuration and control of the operation of processing node 200.

In an exemplary embodiment, software 210 can include instructions for determining a transmission type associated with the wireless device, the transmission type being associated with a transmission between the wireless device and an access node, and based on the transmission type, instructing the wireless device to utilize different antenna configurations, wherein the different antenna configurations comprise different combinations of antennae of the wireless device. In another exemplary embodiment, software 210 can include instructions for determining that a type of a transmission between a wireless device and an access node does not require using all the antennae of the wireless device, and instructing the wireless device to utilize a reduced quantity of antennae for the transmission.

Figure 3:
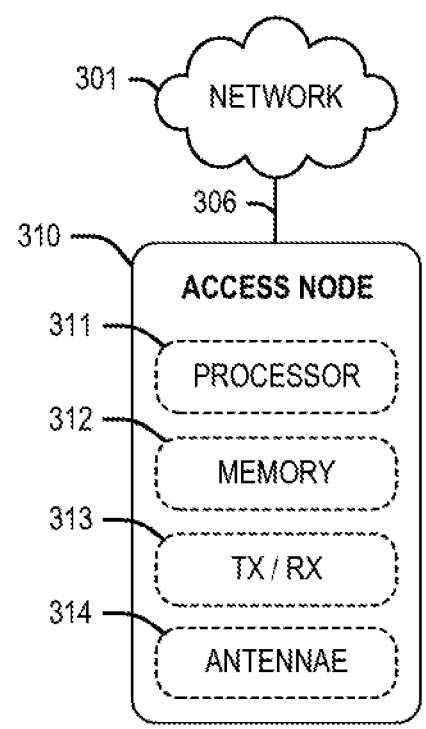
FIG. 3 depicts an exemplary access node for selecting an antenna configuration for a wireless device based on a transmission type.

FIG. 3 depicts an exemplary access node 310 for selecting an antenna configuration for a wireless device based on a transmission type. Access node 310 is configured as an access point for providing network services from network 301 to end-user wireless devices such as wireless device 120 in FIG. 1. Access node 310 is illustrated as comprising a processor 311, a memory 312 for storing logical modules that perform operations described herein, and one or more transceivers 313 for transmitting and receiving signals via antennae 314. Combination of antennae 314 and transceivers 313 are configured to deploy a one or more radio air interfaces using different RATs, frequencies, and/or operating modes. Additional transceivers and antennae may be incorporated in order to deploy 4G, 5G, mm-wave, MU-MIMO or massive MU-MIMO data streams to wireless devices attached to access node 310, as well as to facilitate communication with other network nodes on network 301. Further, access node 310 is communicatively coupled to network 301 via communication interface 306, which may be any wired or wireless link as described above.

In an exemplary embodiment, memory 312 can include instructions for determining a transmission type associated with the wireless device, the transmission type being associated with a transmission between the wireless device and an access node, and based on the transmission type, instructing the wireless device to utilize different antenna configurations, wherein the different antenna configurations comprise different combinations of antennae of the wireless device. In another exemplary embodiment, memory 312 can include instructions for determining that a type of a transmission between a wireless device and an access node does not require using all the antennae of the wireless device, and instructing the wireless device to utilize a reduced quantity of antennae for the transmission.

Figure 4:
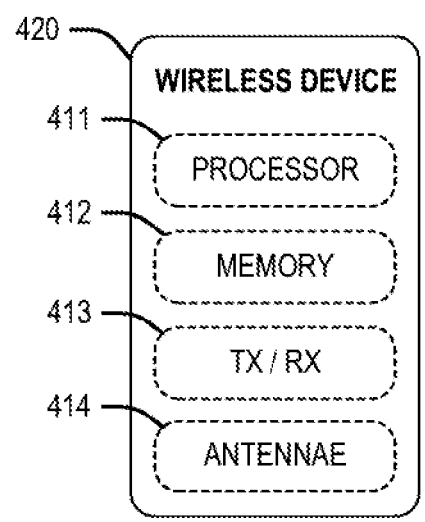
FIG. 4 depicts an exemplary wireless device for selecting an antenna configuration for a wireless device based on a transmission type.

FIG. 4 depicts an exemplary wireless device for selecting an antenna configuration based on a transmission type. Wireless device 420 may be any device, system, combination of devices, or other such communication platform capable of communicating wirelessly with an access node or other network nodes using one or more frequency bands deployed therefrom. Wireless device 420 may be, for example, a mobile phone, a wireless phone, a wireless modem, a personal digital assistant (PDA), a voice over internet protocol (VoIP) phone, a voice over packet (VOP) phone, or a soft phone, as well as other types of devices or systems that can exchange audio or data via access nodes. Other types of communication platforms are possible. Wireless device 420 is illustrated as comprising a processor 411, a memory 412 for storing logical modules that perform operations described herein, and one or more transceivers 413 for transmitting and receiving signals via antennae 414.

Combination of antennae 414 and transceivers 413 are configured to access and communicate via one or more radio air interfaces using different RATs, frequencies, and/or operating modes. For example, transceivers and antennae can be configured to communicate using 4G, 5G, mm-wave, MU-MIMO or massive MU-MIMO, as well as to facilitate communication with other network nodes and wireless devices via, for example, Wi-Fi, BLUETOOTH, NFC, etc. In an exemplary embodiment, memory 412 includes instructions for receiving an instruction to activate or deactivate specific antennae in different configurations based on a type of transmission. In another exemplary embodiment, memory 412 includes instructions for determining a transmission type associated with the wireless device 420 and, based on the transmission type, utilizing different antenna configurations of antennae 414. In another exemplary embodiment, memory 412 can include instructions for determining that a type of a transmission between wireless device 420 and an access node does not require using all the antennae of the wireless device, and utilizing a reduced quantity of antennae 414 for the transmission.

Figure 5:
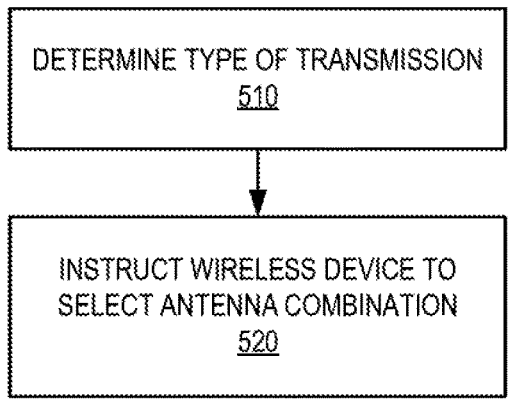
FIG. 5 depicts an exemplary method for selecting an antenna configuration for a wireless device based on a transmission type.

FIG. 5 depicts an exemplary method for selecting an antenna configuration for a wireless device based on a transmission type. The method of FIG. 5 is illustrated with respect to an access node, such as access node 110, 310. In other embodiments, the method can be implemented with any suitable network element, such as a processing node. Although FIG. 5 depicts steps performed in a particular order for purposes of illustration and discussion, the operations discussed herein are not limited to any particular order or arrangement. One skilled in the art, using the disclosures provided herein, will appreciate that various steps of the methods can be omitted, rearranged, combined, and/or adapted in various ways.

At 510, a type of transmission is determined for a transmission between a wireless device and an access node and, at 520, the wireless device is instructed to select an antenna combination based on the type of the transmission. The transmission type can be correlated with different combinations of antennae of the wireless device. Based on the instruction, the wireless device activates or deactivates its antennae in different combinations and arrangements. For example, the various antennae can include 4G antennae, 5G antennae (including sub-6G and mm-wave), 3G or older antennae, and the antennae can be activated in different combinations (such as 4×4 MIMO combination, a 4×2 MIMO combination, a 2×2 MIMO combination), and so on. One or more primary antennae and secondary antennae may be defined, and the wireless device instructed to use different primary and/or secondary antennae for transmissions associated with different priorities. Such correlation of types of transmissions with different combinations of antennae of the wireless device can be enabled by referring to a table associating different QoS identifiers with different combinations of antennae.

Further the wireless device can be instructed to simultaneously utilize different combinations of antennae for simultaneous transmissions of the same or different type. For example, two differently-tuned antennae can be activated for different transmissions that use different frequencies. In another example, two simultaneous 4×2 MIMO transmissions can be received at a wireless device activating two 4×2 MIMO antenna configurations, as opposed to one 4×4 MIMO antenna configuration, or any other antenna configuration. In another example, two different simultaneous transmissions (e.g. a VoIP service and a data streaming service) can be performed using two different antenna configurations that are configured for each specific service (e.g. a high priority or low-latency antenna configuration for the VoIP service and a mm-wave antenna for the data streaming service). Further, the wireless device can be instructed to limit a quantity of antennae being utilized for transmission types that are not correlated with higher quantities of antennae. For example, if a type of transmission does not require a 4×4 MIMO combination of antennae, then an antenna configuration can be selected that uses fewer antennae, e.g. a 4×2 antenna combination or a 2×2 antenna combination.

Instructing the wireless device to utilize the different antenna configurations can include transmitting an indication to the wireless device from the access node. The indication may be an information element sent via radio resource control (RRC) message, in a system information block (SIB) message, or any equivalent means for indicating to the wireless device to activate or utilize the antenna combination(s) correlated with the transmission type or service. The instruction can be sent responsive to receiving the service request, or periodically throughout a communication session. In some examples, the wireless device can initiate communication using a different combination of antennae than what is eventually determined based on the type of data being transmitted. A default number (or all) antennae may be initially activated or used on a wireless device, and then different combinations are deactivated or selected based on transmission type.

Further, the type of the transmission or service can be determined at 510 by obtaining one or more quality of service (QoS) identifiers associated with the transmission or service. For example, the QoS identifier comprises one or more of a QoS Class Identifier (QCI), a 5G QCI (5QI), a priority level, an error rate, a guaranteed bit rate (GBR) identifier, or delay budget. The QoS identifier can be identified or obtained from a service request. For example, the service request for a service can be received at the access node from the wireless device or from a network entity attempting to communicate with the wireless device. Upon receiving the service request, a processing node communicably coupled to the access node can perform the correlation with the antenna configurations and trigger dispatch of the aforementioned instructions to the wireless device.

Figure 6:
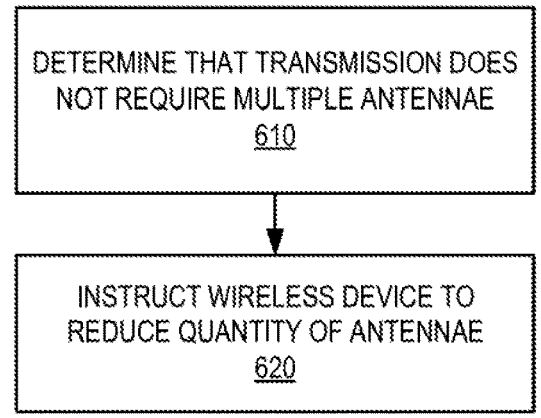
FIG. 6 depicts another exemplary method for selecting an antenna configuration for a wireless device based on a transmission type.

FIG. 6 depicts an exemplary method for selecting an antenna configuration for a wireless device based on a transmission type. The method of FIG. 6 is illustrated with respect to an access node, such as access node 110, 310. In other embodiments, the method can be implemented with any suitable network element, such as a processing node. Although FIG. 6 depicts steps performed in a particular order for purposes of illustration and discussion, the operations discussed herein are not limited to any particular order or arrangement. One skilled in the art, using the disclosures provided herein, will appreciate that various steps of the methods can be omitted, rearranged, combined, and/or adapted in various ways.

At 610, it is determined that a transmission between a wireless device and an access node does not require multiple antennae and, at 620, the wireless device is instructed to reduce a quantity of antenna in use for the transmission. The transmission type can be identified by obtaining one or more quality of service (QoS) identifiers associated with the transmission or service. For example, the QoS identifier comprises one or more of a QoS Class Identifier (QCI), a 5G QCI (5QI), a priority level, an error rate, a guaranteed bit rate (GBR) identifier, or delay budget. The QoS identifier can be identified or obtained from a service request. For example, the service request for a service can be received at the access node from the wireless device or from a network entity attempting to communicate with the wireless device. Upon receiving the service request, a processing node communicably coupled to the access node can perform correlate the transmission type with one or more different combinations of antennae of the wireless device.

Based on the instruction at 620, the wireless device activates or deactivates its antennae in different combinations and arrangements. For example, the various antennae can include 4G antennae, 5G antennae (including sub-6G and mm-wave), 3G or older antennae, and the antennae can be activated in different combinations (such as 4×4 MIMO combination, a 4×2 MIMO combination, a 2×2 MIMO combination), and so on. One or more primary antennae and secondary antennae may be defined, and the wireless device instructed to use different primary and/or secondary antennae for transmissions associated with different priorities. Such correlation of types of transmissions with different combinations of antennae of the wireless device can be enabled by referring to a table associating different QoS identifiers with different combinations of antennae. For example, if a type of transmission does not require a 4×4 MIMO combination of antennae, then an antennae configuration can be selected that uses fewer antennae, e.g. a 4×2 antenna combination or a 2×2 antenna combination. A default number (or all) antennae may be initially activated or used on a wireless device, and then different combinations are deactivated or selected based on transmission type.

Figure 7:
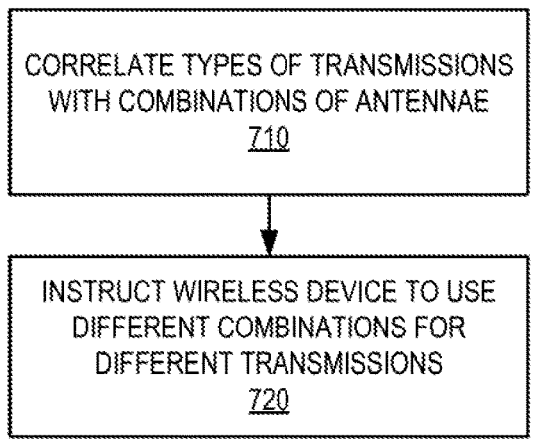
FIG. 7 depicts another exemplary method for selecting an antenna configuration for a wireless device based on a transmission type.

FIG. 7 depicts an exemplary method for selecting an antenna configuration for a wireless device based on a transmission type. The method of FIG. 7 is illustrated with respect to an access node, such as access node 110, 310. In other embodiments, the method can be implemented with any suitable network element, such as a processing node. Although FIG. 7 depicts steps performed in a particular order for purposes of illustration and discussion, the operations discussed herein are not limited to any particular order or arrangement. One skilled in the art, using the disclosures provided herein, will appreciate that various steps of the methods can be omitted, rearranged, combined, and/or adapted in various ways.

At 710, different types of transmissions are correlated with different combinations of antennae of a wireless device and, at 720, the wireless device is instructed to use different combinations for the transmissions of different types. Based on the instruction, the wireless device activates or deactivates its antennae in different combinations and arrangements. For example, the various antennae can include 4G antennae, 5G antennae (including sub-6G and mm-wave), 3G or older antennae, and the antennae can be activated in different combinations (such as 4×4 MIMO combination, a 4×2 MIMO combination, a 2×2 MIMO combination), and so on. One or more primary antennae and secondary antennae may be defined, and the wireless device instructed to use different primary and/or secondary antennae for transmissions associated with different priorities. Such correlation of types of transmissions with different combinations of antennae of the wireless device can be enabled by referring to a table associating different QoS identifiers with different combinations of antennae.

Further the wireless device can be instructed to simultaneously utilize different combinations of antennae for simultaneous transmissions of the same or different type. For example, two differently-tuned antennae can be activated for different transmissions that use different frequencies. In another example, two simultaneous 4×2 MIMO transmissions can be received at a wireless device activating two 4×2 MIMO antenna configurations, as opposed to one 4×4 MIMO antenna configuration, or any other antenna configuration. In another example, two different simultaneous transmissions (e.g. a VoIP service and a data streaming service) can be performed using two different antenna configurations that are configured for each specific service (e.g. a high priority or low-latency antenna configuration for the VoIP service and a mm-wave antenna for the data streaming service). Further, the wireless device can be instructed to limit a quantity of antennae being utilized for transmission types that are not correlated with higher quantities of antennae. For example, if a type of transmission does not require a 4×4 MIMO combination of antennae, then an antennae configuration can be selected that uses fewer antennae, e.g. a 4×2 antenna combination or a 2×2 antenna combination.

Instructing the wireless device to utilize the different antenna configurations can include transmitting an indication to the wireless device from the access node. The indication may be an information element sent via radio resource control (RRC) message, in a system information block (SIB) message, or any equivalent means for indicating to the wireless device to activate or utilize the antenna combination(s) correlated with the transmission type or service. The instruction can be sent responsive to receiving the service request, or periodically throughout a communication session. In some examples, the wireless device can initiate communication using a different combination of antennae than what is eventually determined based on the type of data being transmitted. A default number (or all) antennae may be initially activated or used on a wireless device, and then different combinations are deactivated or selected based on transmission type.

Further, the type of the transmission or service can be determined at 710 by obtaining one or more quality of service (QoS) identifiers associated with the transmission or service. For example, the QoS identifier comprises one or more of a QoS Class Identifier (QCI), a 5G QCI (5QI), a priority level, an error rate, a guaranteed bit rate (GBR) identifier, or delay budget. The QoS identifier can be identified or obtained from a service request. For example, the service request for a service can be received at the access node from the wireless device or from a network entity attempting to communicate with the wireless device. Upon receiving the service request, a processing node communicably coupled to the access node can perform the correlation with the antenna configurations and trigger dispatch of the aforementioned instructions to the wireless device.

Figure 8:
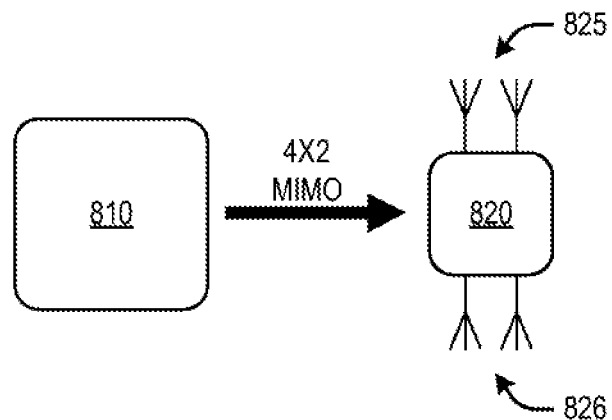
FIG. 8 depicts an exemplary selection of an antenna configuration of a wireless device based on a transmission type.

FIG. 8 depicts an access node 810 transmitting a 4×2 MIMO stream to a wireless device 820 comprising antennae 825 and 826. Based on the aforementioned operations, multi-antenna connectivity is enabled by using different antennae of wireless device 820 based on a type of service or transmission. In this example, the identification of the 4×2 MIMO stream may be performed based on quality of service (QoS) parameters obtained from a service request. Further, antennae 825 can include a configuration of two MIMO antennae, and similarly antennae 826 can include another two MIMO antennae. Thus, wireless device 820 is instructed to dynamically use one of the sets of two antennae 825, 826, dynamically switching between different antennae configurations.

Figure 9A:
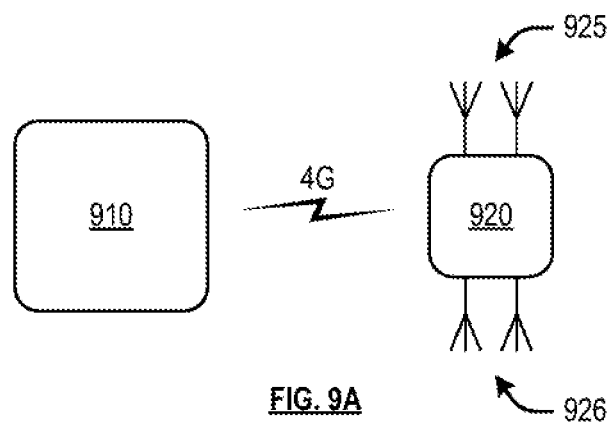
FIGS. 9A-9B depict exemplary selections of an antenna configuration of a wireless device based on a transmission type.
Figure 9B:
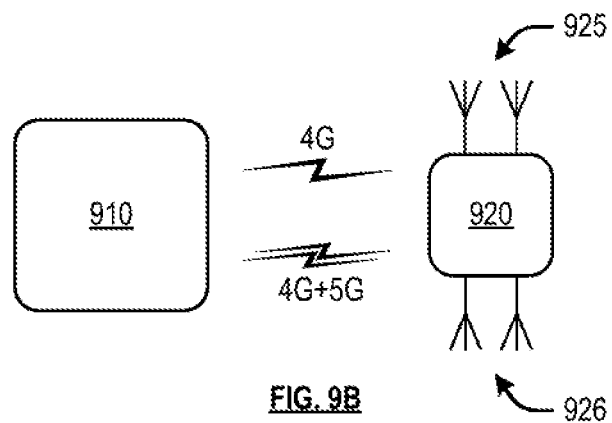

FIGS. 9A-9B depict an access node 910 transmitting different types of transmissions to wireless device 920, with wireless device 920 being configured or instructed to select different antenna configurations based on the types of the transmissions. In this embodiment, wireless device comprises antennae 925 associated with a first RAT and antennae 925 associated with a second RAT. For example, the first RAT can be 4G, and the second RAT can be 5G. Other combinations of RATs are possible, including 3G, sub6G, mm-wave, and so on, with the understanding that antennae associated with a later technology can be backwards-compatible with an earlier technology.

With reference to FIG. 9A, access node 910 transmits a 4G stream and, in response wireless device 920 is configured or instructed to activate any combination of the 4G antennae 925 and/or the 5G antennae 926 (which may be backwards compatible with 4G). Further, wireless device 920 is configured or instructed to utilize only one or two antennae, thereby saving power and minimizing interference by not using the other antennae. Whereas, with reference to FIG. 9B, access node 910 transmits a simultaneous 4G and a 5G stream (e.g. by using dual connectivity) in addition to a separate 4G stream. In response, wireless device 920 is configured or instructed to dynamically activate the 4G antennae 925 and the 5G antennae 926, and communicate with the concurrent 4G and 5G stream with the 5G antennae 926, while continuing the 4G stream with one or both of the 4G antennae 925.

The exemplary systems and methods described herein can be performed under the control of a processing system executing computer-readable codes embodied on a computer-readable recording medium or communication signals transmitted through a transitory medium. The computer-readable recording medium is any data storage device that can store data readable by a processing system, and includes both volatile and nonvolatile media, removable and non-removable media, and contemplates media readable by a database, a computer, and various other network devices.

Examples of the computer-readable recording medium include, but are not limited to, read-only memory (ROM), random-access memory (RAM), erasable electrically programmable ROM (EEPROM), flash memory or other memory technology, holographic media or other optical disc storage, magnetic storage including magnetic tape and magnetic disk, and solid state storage devices. The computer-readable recording medium can also be distributed over network-coupled computer systems so that the computer-readable code is stored and executed in a distributed fashion. The communication signals transmitted through a transitory medium may include, for example, modulated signals transmitted through wired or wireless transmission paths.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

The invention claimed is:

1. A method for selecting an antenna configuration for a wireless device based on a transmission type, the method comprising:
   receiving, at an access node, a service request from the wireless device, the service request including an associated quality of service (QoS) identifier, the wireless device comprising a plurality of antennae;
   determining, at the access node, different transmission types associated with communication between the access node and the wireless device based on the associated QoS identifier received with the service request;
   correlating the different transmission types with antenna configurations of the wireless device based on a table associating a plurality of quality of service (QoS) QoS identifiers with a plurality of antenna configurations of the wireless device, the table including the associated QoS identifier included with the service request, the different transmission types respectively being associated with a transmission between the wireless device and the access node; and based on the determined transmission type and the correlated antenna configurations from the table, transmitting an instruction from the access node to the wireless device to utilize one of the plurality of antenna configurations corresponding to the associated QoS identifier included with the service request, wherein the different transmission types correspond to transmissions that use different radio access technologies (RATs), transmissions that use different frequencies, transmissions that use different MIMO configurations, or combinations thereof, wherein the different antenna configurations comprise the selective activation and deactivation of different combinations of the plurality of antennae of the wireless device.

2. The method of claim 1, further comprising correlating the different transmission types with the different combinations of the plurality of antennae.

3. The method of claim 2, wherein the different combinations comprise at least: one or more 4G antennae, one or more 5G antennae, one or more antennae of a RAT other than 4G and 5G, one or more 5G sub 6G antennae, one or more 5G millimeter wave antennae, a 4×4 MIMO combination of antennae, a 4×2 MIMO combination of antennae, a 2×2 MIMO combination of antennae, a combination using one or more primary antennae, a combination using one or more secondary antennae, or any combination of the different combinations.

4. The method of claim 2, further comprising transmitting an instruction to the wireless device to simultaneously utilize different combinations of the plurality of antennae for simultaneous transmissions.

5. The method of claim 2, further comprising transmitting an instruction to the wireless device to limit a quantity of the plurality of antennae being utilized for determined transmission types that are not correlated with higher quantities of the plurality of antennae.

6. The method of claim 2, wherein transmitting the instruction to the wireless device to utilize the different antenna configurations comprises transmitting an indication in a system block information (SIB) message to the wireless device from the access node.

7. The method of claim 1, wherein the QoS identifier comprises one or more of a QoS Class Identifier (QCI), a 5G QCI (5QI), a priority level, an error rate, a guaranteed bit rate (GBR) identifier, or delay budget.

8. The method of claim 1, further comprising identifying the QoS identifier based on the service request.

9. A method for selecting combinations of antennae of a wireless device, the method comprising:
receiving, at an access node, a service request from the wireless device, the service request including an associated quality of service (QoS) identifier, the wireless device comprising a plurality of antennae;
determining, at the access node or a processing node accessible to the access node, a transmission type of the wireless device based on the associated QoS identifier, wherein multiple different transmission types correspond to transmissions that use different radio access technologies (RATs), transmissions that use different frequencies, transmissions that use different MIMO configurations, or combinations thereof;
determining at the access node or a processing node accessible to the access node that a communication between the wireless device and the access node does not require using all of the plurality of antennae of the wireless device based on a table associating a plurality of quality of service (QoS) identifiers with a plurality of antenna configurations of the wireless device, one of the plurality of QoS identifiers being the associated QoS identifier included with the service request; and
transmitting an instruction from the access node to the wireless device to selectively activate and deactivate one or more of the plurality of antennae, thereby to utilize a reduced quantity of the plurality of antennae for the transmission, the reduced quantity of the plurality of antennae being based on one of the plurality of antenna configurations corresponding to the associated QoS identifier included with the service request.

10. The method of claim 9, further comprising correlating the communication with one or more different combinations of the plurality of antennae of the wireless device.

11. The method of claim 10, wherein transmitting the instruction to the wireless device to utilize the reduced quantity of the plurality of antennae comprises transmitting an instruction in a system information block (SIB) to the wireless device to activate or deactivate the one or more of the plurality of antennae of the wireless device.

12. The method of claim 9, wherein the QoS identifier comprises one or more of a QoS Class Identifier (QCI), a 5G QCI (5QI), a priority level, an error rate, a guaranteed bit rate (GBR) identifier, or delay budget.

13. A system for selecting combinations of antennae of a wireless device comprising a plurality of antennae, the system comprising:
an access node configured to provide communication between the wireless device and a network;
a processor communicably coupled to the access node processing node, the processor being configured to perform operations comprising:
receiving a service request from the wireless device, the service request including an associated quality of service (QoS) identifier;
determining different transmission types associated with communication between the access node and the wireless device based on the associated QoS identifier received with the service request;
correlating the different transmission types with antenna configurations of the wireless device based on a table accessible to the access node associating a plurality of QoS identifiers with a plurality of antenna configurations of the wireless device, the table including the associated QoS identifier included with the service request, the different transmission types respectively being associated with a transmission between the wireless device and the access node; and
based on the determined transmission type and the correlated antenna configurations from the table, transmitting an instruction from the access node to the wireless device to utilize one of the plurality of antenna configurations corresponding to the associated QoS identifier included with the service request,
wherein the different transmission types correspond to transmissions that use different radio access technologies (RATs), transmissions that use different frequencies, transmissions that use different MIMO configurations, or combinations thereof,
wherein the different antenna configurations comprise the selective activation and deactivation of different combinations of the plurality of antennae of the wireless device.

14. The system of claim 13, wherein the operations further comprise correlating the different transmission types with the different combinations of the plurality of antennae.

15. The system of claim 14, wherein correlating the different transmission types with the different combinations of the plurality of antennae comprises referring to a table associating different QoS identifiers with the different combinations of the plurality of antennae.

16. The system of claim 14, wherein the wireless device is instructed to limit a quantity of the plurality of antennae being utilized for determined transmission types that are not correlated with higher quantities of the plurality of antennae.

17. The system of claim 13, wherein transmitting the instruction to the wireless device to selectively utilize the different combinations of the plurality of antennae comprises transmitting an indication in a system information block (SIB) message to the wireless device from the access node to which the wireless device is attached.

18. The system of claim 17, wherein the indication comprises an information element.

* * * * *